3,004,855
STARCH ADHESIVE COMPOSITIONS
Clifford E. Smith and John V. Tuschhoff, Decatur, Ill., assignors to A. E. Staley Manufacturing Company, Decatur, Ill., a corporation of Delaware
No Drawing. Filed June 30, 1958, Ser. No. 745,243
6 Claims. (Cl. 106—213)

This invention relates to fluid starchy adhesive compositions, useful primarily in the manufacture of corrugated paper board and paper bags. More particularly, it relates to a novel method of increasing the resistance of such adhesives to loss of viscosity produced by pumping, stirring, and the like, and to the improved compositions thus obtained.

A widely used corrugated paper board adhesive consists essentially of a suspension of ungelatinized starch in a thin paste of gelatinized starch. The viscosity and solids content of the paste are important factors influencing the speed with which the paper board machine may be operated, and also the quality of the finished paper board. The suspending paste, or carrier medium, must be sufficiently viscous to counteract the tendency of the ungelatinized starch granules to settle out of the unstirred adhesive, but not so viscous as to interfere with applying the adhesive to the paper board or to impede its recirculation in the paper board machine. The nature and proportion of dissolved solids in the carrier medium influence the speed with which a given paper stock absorbs water from the applied adhesive. A small degree of water absorption is desirable because it is essential to forming a strong bond between the paper plies. Absorption of water beyond that required to give a good bond is undesirable because it robs the adhesive of water needed to complete the gelatinization of the suspended starch and leads to an inferior bond between the plies.

During operation of a modern corrugated paper board machine, the adhesive is continuously circulated between a supply tank and the point of application. Most of the machines are equipped with glue applicator rolls for applying the adhesive to the tips of the corrugated portion of the paper board. One roll rotates partially immersed in a shallow pan through which the adhesive is recirculated. The film of adhesive picked up by the rotating roll is smoothed out to a constant and predetermined thickness by a wiper roll rotating in opposite direction and set a small distance away from the pickup roll. The recirculated adhesive is thus subjected to considerable agitation and mechanical shearing. Under these conditions, the conventional starchy corrugating adhesives lose viscosity, and this loss, if not restored, leads to lowered product quality. At a given machine speed and a given setting between the pickup and wiper applicator rolls, the amount of adhesive applied to the tips of the corrugated portion of the paper board varies markedly with the viscosity of the adhesive. If too little adhesive is applied, the bond is weak. If too much is applied, the heater section of the paper board machine may be inadequate to develop the full strength of the bond and deliver a sufficiently dried product. Thus it is common practice to control the adhesive viscosity within rather narrow limits.

The viscosity drop in conventional corrugating and paper bag adhesives during recirculation is not surprising because it is known that conventional starch paste can be thinned by stirring and other forms of agitation. The stirring or shearing action disintegrates the swollen starch granules, which are small pieces of soft, highly hydrated gel, and this subdivision of the gel structure lowers the viscosity.

Our invention is applicable broadly to starchy adhesive compositions consisting wholly or in part of a starch paste derived from unmodified or slightly modified starch or starches. The starch may be waxy or non-waxy, and it may be derived from the root, stem, or fruit of a plant. The advantages and benefits of our invention, particularly the viscosity stabilizing feature, decrease as the degree of starch modification increases. This is due to the fact that the more highly modified products, such as the oxidized starches, the acid-modified thin-boiling starches, and dextrins yield pastes which are inherently more viscosity-stable. The modified starch granules disintegrate to a greater extent during pasting, thus yielding a paste structure which is less susceptible to alteration or breakdown by stirring or shearing.

As indicated above, the problem of preventing viscosity change, either loss or gain, during recirculation of the adhesive is of considerable practical importance, and has received much attention. Several solutions have been advanced, and used to some extent commercially, but all include at least one disadvantage, usually a substantial cost increase. One solution is to agitate the adhesive vigorously, as by passing it through a commercial homogenizer, before it is placed in use. Another is to replace the starch paste suspending medium of corrugating adhesives with a vegetable gum solution which does not change viscosity appreciably when stirred. Both of these solutions, however, increase the adhesive cost.

The primary object of our invention is to prevent the objectionable viscosity drop of liquid starchy adhesives when stirred or otherwise agitated, which adhesives consist wholly or in part of a paste of unmodified or slightly modified starch.

Another object of our invention is to increase the viscosity of the starchy adhesive composition at the same solids content, thus permitting the use of less material and reducing the cost.

Additional objects will be apparent from the following description of our invention.

The foregoing objects are achieved according to our invention by means of a simple and inexpensive modification of the conventional preparation of the adhesive composition. The modification consists of treating the starch paste portion alone with a reagent which stabilizes the paste against the viscosity breakdown during agitation, and which also increases the paste viscosity. The required reagents are polyfunctional organic compounds reactive with starch under alkaline conditions. At least two reactive functional groups are required, and the commercially preferred one contains only two such groups. The following compounds are illustrative examples: epichlorohydrin, acrolein, acrylonitrile, divinyl sulfone, epibromohydrin, and aliphatic dihalides, such as glycerol dichlorohydrin, propylene dichloride, ethylene dibromide, the dichloro- and dibromobutanes and the dichloro and dibromopentanes.

The foregoing compounds and others of similar character are reactive with alkaline starch paste and with aqueous alkaline slurries of ungelatinized starch granules. Satisfactory reaction rate can be obtained at a temperature as low as 80° F., but useful results are obtained at lower temperatures with increased reaction time. Reaction temperatures up to 200° F. and higher, can be used if desired, but generally they are unnecessary and increase heating cost. The preferred range of reaction alkalinity is 9–12 pH, but useful results can be obtained at higher pH values.

It is thought that the observed effects, namely, increased and stabilized viscosity, are due to cross-linking between hydroxyl groups in the starch molecules. With epichlorohydrin, for example, the evidence points to formation of the $S-O-CH_2-CHOH-CH_2-O-S_1$ grouping, where S and $S_1$ are separate starch molecules.

Our invention is particularly adaptable to the alkaline starchy corrugating adhesives, which comprise 90 to 95% of the volume of starchy adhesives used in the corrugated paper board industry. The alkaline compositions are preferred because (1) alkali facilitates the pasting of the starch in preparing the carrier medium, and (2) alkali increases the stringiness or cohesiveness of starch pastes and permits the use of higher machine speeds. It is accordingly convenient to stir the reactive polyfunctional compound into the alkaline starch paste, allow the reaction to proceed to completion, which usually requires only 15 to 30 minutes, then stir in the ungalatinized starch to complete the preparation of the adhesive.

Small proportions of the reactive polyfunctional compounds, based on the weight of the carrier medium starch, are effective. For example, as little as 0.1 to 0.5 percent by weight of epichlorohydrin, the preferred polyfunctional compound, will produce the desired increase and stability of viscosity. Somewhat higher proportions may be required when working with other polyfunctional compounds and other starches, but generally speaking, not more than 5% of the polyfunctional compound based on the weight of starch will be needed.

We have found that the effectiveness of a given proportion of polyfunctional compound, and its rate of reaction with the starch, increase with the concentration of starch in the reaction paste. Accordingly, it is desirable to carry out the reaction at the maximum commercially feasible starch concentration. This fits in quite well with the conventional method of preparing alkaline starchy corrugating adhesives. The carrier medium or paste is first prepared at moderately high concentrations with warm water and alkali. It is then diluted with cool water and mixed with the ungelatinized starch portion. The desired increase in stability of viscosity can be obtained by the method of our invention, when applied to more dilute alkaline starch paste, such as those of the finished corrugated adhesive compositions, but the reaction will take longer, and a substantially higher proportion of polyfunctional compound will be required.

The following specific examples will further illustrate our invention and describe preferred embodiments thereof.

EXAMPLE 1

Unmodified commercial corn starch (100 pounds, 12% moisture) is mixed with 500 pounds of water at 120° F. in a tank equipped with a stirrer designed for thick starch pastes. The slurry of water and starch granules is transformed into a smooth viscous paste by adding, with stirring, a solution of 20 pounds of sodium hydroxide in 50 pounds of water at 120° F. and continuing the stirring for 15 minutes. Epichlorohydrin (0.3 pound) is then mixed into the alkaline paste and stirring is continued for an additional 20 minutes. The paste becomes noticeably more viscous shortly after the epichlorohydrin is added. After the 20 minute reaction period, the paste is diluted with 550 pounds of cool water at 80–90° F. Meanwhile, in a separate stirrer-equipped tank, 500 pounds of unmodified commercial corn starch is mixed with 900 pounds of water at 100° F. The alkaline paste and the starch slurry are combined. After the mixture of paste and slurry has been stirred a few minutes to distribute the starch granules uniformly, it is ready for use as a corrugated paperboard adhesive. It has a temperature of about 100° F. and a viscosity of 30 seconds, as measured by a later-described test, and it is particularly suitable for the preparation of corrugated paper board by the single facer method.

EXAMPLE 2

The procedure of Example 1 is repeated except that the 0.3 pound of epichlorohydrin is replaced with 0.4 pound of acrolein. The final composition has a viscosity of 29 seconds and is suitable for the same use mentioned in Example 1.

EXAMPLE 3

The procedure of Example 1 is repeated except that the unmodified corn starch is replaced with an acid-modified thin-boiling corn starch (100 pounds, 12% moisture) having a 4 gram alkali fluidity of 20–25 mls. The final composition has a viscosity of 32 seconds and is suitable for the single facer preparation of corrugated paper board.

EXAMPLE 4

The procedure of Example 1 is repeated except that the quantity of epichlorohydrin is increased to 0.5 pound. The final composition has a viscosity of 50 seconds and is suitable for the double backer preparation of corrugated paper board.

EXAMPLE 5

The procedure of Example 1 is repeated except that the unmodified corn starch is replaced with the quantity and kind of acid-modified starch used in Example 3, and the quantity of epichlorohydrin is increased to 0.4 pound. The final composition has a viscosity of 56 seconds and is suitable for the double backer preparation of corrugated paper board.

The method for measuring the viscosity of starchy corrugated paper board adhesives employs a vertical cylindrical vessel open at the top and closed at the bottom with a horizontal plate in which is centrally drilled a small hole of such size that the vessel, when filled with water at 75° F., will deliver by gravity flow 100 mls. of water in 15 seconds. The viscosity of a corrugating adhesive, such as those described in the foregoing examples, is measured by filling the vessel with adhesive at 100° F. and noting how long (in seconds) is required for 100 mls. to flow through the plate opening. All of the viscosity data presented in this application were measured by means of this system.

A convenient method of comparing viscosity stability of the adhesive compositions is to subject them to an accelerated shearing test consisting of a combination of high speed propeller-blade stirrer and gear pump. One hour's "punishment" in this test was equivalent to 4.5 hours' "punishment" in a typical corrugated paper board machine. The data collected in the following table further illustrate the advantages of our invention.

*Table 1*

| Kind of carrier starch | Amount of starch | Amount of epichlorohydrin | Viscosity after— | | | |
|---|---|---|---|---|---|---|
| | | | 15 min. | 45 min. | 75 min. | 105 min. |
| | Gms. | Gms. | Sec. | Sec. | Sec. | Sec. |
| Unmodified corn starch | 100 | 0 | 30 | 23 | 19 | 19 |
| Do | 100 | 0.1 | 23 | 23 | 25 | 25 |
| Do | 100 | 0.2 | 26 | 25 | 27 | 26 |
| Do | 100 | 0.4 | 38 | 37 | 37 | 37 |
| Acid modified corn starch | 120 | 0 | 23 | 23 | 23 | 23 |
| Do | 100 | 0.2 | 23 | 22 | 23 | 24 |
| Do | 100 | 0.5 | 76 | 70 | 69 | 68 |

The data in Table 1 show clearly how the process of our invention increases and stabilizes the viscosity of an adhesive containing a paste of unmodified corn starch. They also show that the viscosity of an adhesive based on an acid-modified thin-boiling starch paste is increased by the same process. All of the adhesives in Table 1 are alkaline corrugating adhesives similar to those described in Examples 1–5. They contain five parts of ungelatinized starch per one part of pasted starch, and twenty parts of water per six parts of total starch.

From the data in Table 1 it is evident that 0.2 part of epichlorohydrin will, in effect, replace 20 parts of an acid modified thin boiling starch. With the starch at $0.08/lb. and the epichlorohydrin costing $0.30/lb., the material's cost reduction is $1.57 per 100 pounds of carrier starch.

We claim:

1. In the method of preparing corrugated board in which a starchy adhesive is applied to a corrugated board ply, the adhesive being a suspension of ungelatinized starch in a prepared aqueous starch paste carrier, the improvement for stabilizing the viscosity of said adhesive during its application that comprises preparing a starch paste with an alkalinity of at least pH 9, reacting said paste with up to 5% of a polyfunctional cross-linking reagent having at least two functional groups which, at said alkalinity, react to combine with starch through the oxygen atoms of starch hydroxyl groups, thereby to stabilize the viscosity of said paste, then suspending the ungelatinized starch in the reacted paste to form the adhesive and gelatinizing the ungelatinized starch between plies of the corrugated board, said functional groups being selected from the group consisting of halogen, aldehyde, vinyl, epoxy and nitrile.

2. The method of claim 1 wherein the starch paste carrier is prepared from native corn starch.

3. The method of claim 1 wherein the starch paste carrier is derived from an acid-modified, thin-boiling corn starch that forms a paste of unstable viscosity.

4. The method of claim 1 in which the polyfunctional cross-linking agent is epichlorohydrin.

5. The method of claim 1 in which the polyfunctional cross-linking agent is acrolein.

6. In the method of preparing corrugated board in which a starchy adhesive is applied to a corrugated board ply, the adhesive being a suspension of ungelatinized starch in a prepared aqueous starch paste, the improvement for stabilizing the viscosity of said adhesive during its application that comprises preparing a starch paste with an alkalinity of at least pH 9, reacting said paste with up to 5% of a polyfunctional cross-linking agent to stabilize the viscosity of said paste, said polyfunctional cross-linking agent being selected from the group consisting of epichlorohydrin, acrolein, acrylonitrile, divinyl sulfone, and epibromohydrin and aliphatic dihalides, then suspending the ungelatinized starch in the reacted paste to form the adhesive and gelatinizing the ungelatinized starch between plies of the corrugated board.

References Cited in the file of this patent

UNITED STATES PATENTS

| | | |
|---|---|---|
| 2,102,937 | Bauer | Dec. 21, 1937 |
| 2,148,952 | Maxwell | Feb. 28, 1939 |
| 2,258,741 | Champion et al. | Oct. 14, 1941 |
| 2,397,437 | Rust | Mar. 26, 1946 |
| 2,548,455 | Walker | Apr. 10, 1951 |
| 2,805,220 | Gerwitz | Sept. 3, 1957 |